United States Patent [19]
Clayton et al.

[11] Patent Number: 5,851,259
[45] Date of Patent: Dec. 22, 1998

[54] METHOD FOR MAKING GE-DOPED OPTICAL FIBERS HAVING REDUCED BRILLOUIN SCATTERING

[75] Inventors: Jane Bilecky Clayton, Suwanee, Ga.; Lars Erik Eskildsen, Fair Haven, N.J.; Per Bang Hansen, Bradley Beach, N.J.; Clifford Headley, North Plainfield, N.J.; William Alfred Reed, Summit, N.J.

[73] Assignee: Lucent Technologies Inc., Murray Hill, N.J.

[21] Appl. No.: 741,495

[22] Filed: Oct. 30, 1996

[51] Int. Cl.⁶ .................................................. C03B 37/027
[52] U.S. Cl. .............................. 65/377; 65/435; 65/381; 385/123
[58] Field of Search ............................... 385/123; 65/377, 65/381, 435, 486, 398, 399

[56] References Cited

U.S. PATENT DOCUMENTS

| | | | |
|---|---|---|---|
| 5,303,318 | 4/1994 | Tateda et al. | 385/123 |
| 5,681,365 | 10/1997 | Gilliland et al. | 65/377 |

FOREIGN PATENT DOCUMENTS

| | | |
|---|---|---|
| 0518749 | 12/1992 | European Pat. Off. . |
| 0540042 | 5/1993 | European Pat. Off. . |

OTHER PUBLICATIONS

Seto Katsuyuki, "Production of NA–conversion Optical Fiber" Patent abstracts of Japan, (1990), 14 (80),P. 196.

A. Wada et al, "Suppression of the Stimulated Brillouin Scattering By Intentionally Induced Periodical Residual–Strain in Single–Mode Optical Fibers" Proceedings of the European Conference on Optical Communication (ECOC 1991), MoB1–1, pp. 25–28.

K Shiraki et al, "Suppression of Stimulated Brillouin Scattering in a Fibre by Changing the Core Radius" Electronic Letters, (1995) 31 (8), pp. 668–669.

Suda Hiroyuki, "Wire Drawing of Optical Fiber", Patent Abstracts of Japan, (1998), 12 (467.

*Primary Examiner*—Phan T.H. Palmer

[57] ABSTRACT

In accordance with the invention, a Ge-doped optical fiber having reduced Brillouin scattering loss is made by modulating the tension applied to the fiber during draw. The draw tension is modulated between a low range 10–50 g and a high in the range 150–250 g. The result is SBS suppression with no significant change to end-to-end fiber loss or dispersion factors.

5 Claims, 2 Drawing Sheets

METHOD FOR MAKING GE-DOPED OPTICAL FIBERS HAVING REDUCED BRILLOUIN SCATTERING

FIELD OF THE INVENTION

This invention relates to a method for making Ge-doped optical fibers having reduced loss due to stimulated Brillouin scattering.

BACKGROUND OF THE INVENTION

Optical fibers are key components in modern telecommunications systems. They are thin strands of glass capable of transmitting an optical signal containing a large amount of information over long distances with very low loss.

In essence, an optical fiber is a small diameter waveguide characterized by a core with a first index of refraction surrounded by a cladding having a second (lower) index of refraction. Light rays which impinge upon the core at an angle less than a critical acceptance angle undergo total internal reflection within the fiber core. These rays are guided along the axis of the fiber with minimum attenuation. Typical telecommunications fibers are made of high purity silica with Germania-doping in the core to raise the index of refraction.

Optical fibers are typically manufactured by constructing an optical fiber preform of appropriate composition and drawing fiber from the preform. In conventional manufacture, the preform is lowered into the insulated susceptor of an RF induction furnace where it is heated to a high drawing temperature. A strand of glass is pulled from the heated portion of the preform at a tension and rate to draw a fiber of desired diameter.

One limitation of such fiber for telecommunications applications is loss due to stimulated Brilouin scattering (SBS). SBS occurs because an input (pump) lightwave traveling through the fiber generates an acoustic wave through the process of electrostriction. The acoustic wave, in turn, causes a periodic modulation of the fiber refractive index which operates as a Bragg grating from which photons can be scattered. The result is selective amplification of a slightly frequency downshifted lightwave (Stokes wave) propagating in the direction opposite from the pump wave.

A variety of experimental efforts have been made to reduce SBS by varying fiber properties, but none have shown particular promise for use with Ge-doped telecommunications fibers. Experimenters have reduced SBS by changing the concentration of fluorine dopant along the fiber length. See Tateda et al. OFC/IOOC 1993 Technical Digest Paper Th 14 and K. Shiraki et al., *J. Lightwave Technol.*, 14, pp. 50–57 and 549–554 (both 1996). However this changing of the dopant concentration adversely affects other properties of a telecommunications fiber.

Other experimenters using fibers with undoped silica cores have shown that rectangular modulation of the drawing tension with an amplitude of 16 g every 2.5 km reduced SBS. See A. Wada et al., *Proc. European Conf on Opt. Commun.* 1991 MoBl (1991). But Wada et al. omitted Ge dopants from the core so that the core would solidify before the cladding during the drawing process, thereby placing the residual strain in the core. In contrast, with Ge-doped cores, the cladding solidifies first, greatly reducing the strain on the core. As a consequence, Wada et al. indicated that any reduction of SBS in commonly used Ge-doped fibers would be very small. Accordingly there remains a need for a method of making Ge-doped telecommunications fibers having reduced Brillouin scattering.

SUMMARY OF THE INVENTION

In accordance with the invention, a Ge-doped optical fiber having reduced Brillouin scattering loss is made by modulating the tension applied to the fiber during draw. The draw tension is modulated between a low range 10–50 g and a high in the range 150–250 g. The result is SBS suppression with no significant change to end-to-end fiber loss or dispersion factors.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and, except for the graphs, are not to scale.

DETAILED DESCRIPTION

Figure 1:
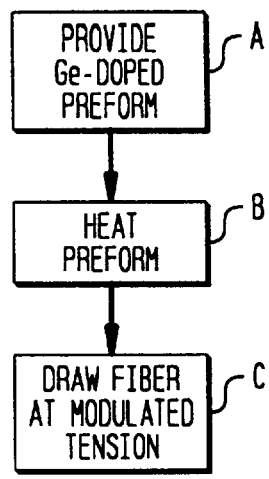
FIG. 1 is a flow diagram of a preferred method for making an optical fiber in accordance with the invention.

Referring to the drawings, FIG. 1 is a flow diagram showing the steps for making an optical fiber in accordance with a preferred embodiment of the invention. As shown in block A of FIG. 1, the first step is to provide a Ge-doped optical fiber preform. The preform can be a conventional preform of the kind typically used to make telecommunications fiber. It is typically a concentric glass rod having a length of about one meter and an outer diameter of 20–200 mm. The inner core of the rod is a high purity, low loss germanium silicate glass having a diameter of about 1–5 mm. The concentric outer cylinder, referred to as cladding, is a layer of glass with a lower index of refraction than the inner core.

The next step shown in block B, is to heat a region of the preform (an end portion) to high temperature so that a fiber can be drawn. Typically, this is accomplished by lowering the preform into an RF induction furnace and heating it to melting temperature.

The third step (block C) is to draw fiber from the heated preform at an appropriately modulated tension. Upon sufficient heating, a melted end portion of the preform bearing a glass strand drops, and the strand is inserted into a fiber drawing station. The parameters are then adjusted to produce a fiber of desired diameter and uniformity.

Figure 2:
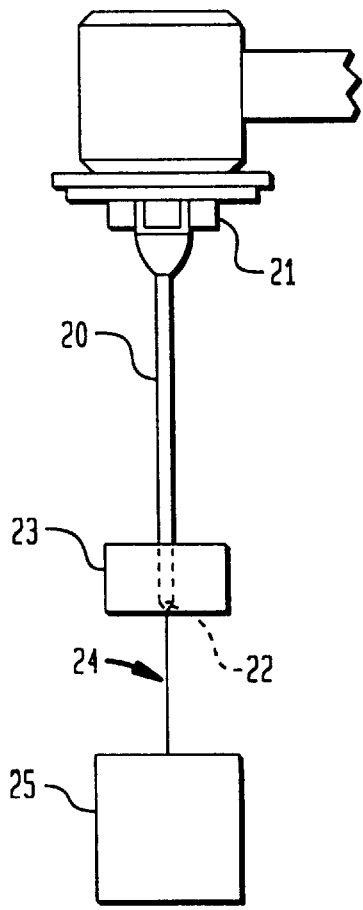
FIG. 2 schematically depicts apparatus for making fiber in accordance with the method of FIG. 1.

FIG. 2 schematically illustrates the optical preform 20 on a suitable mount 21 with the preform end 22 disposed within a heating furnace 23. The strand 24 has been inserted into the drawing station 25. The drawing station can be a conventional fiber drawing station such as described in *Optical Fiber Telecommunications*, Ed. S. E. Miller and I. P. Kaminow (Academic Press, 1988), pp. 182–185, which is incorporated herein by reference. The fiber drawing speed and tension can be under control of a computer.

In accordance with the invention, the draw tension on the fiber is modulated with respect to fiber length in a sinusoidal, triangular or, preferably, a trapezoidal waveform essentially between a minimum in the range 10 to 50 g and a maximum in the range 150 to 250 g. The sinusiodal waveform is actually the positive half of a true sinusoid, and its wavelength as referred to herein is the length from the minimum tension range to the maximum back to the minimum. The preferred wavelength of a sinusoidal is in the range 3 to 30 km. The preferred triangular waveform is characterized by a base along the length in the range 3 to 30 km; and the preferred trapezoidal waveform has a pair of bases along the fiber length: a major base in the range 3 km to 15 km and a minor base in the range 1 km to 13 km.

The resulting product is drawn optical fiber having a Ge-doped core and a cladding surrounding the core. The core is characterized by a repeated pattern of modulated strain. The strain is modulated with length between a low produced by 10–50 g of stress in the draw to a high produced by 150–250 g stress in the draw. The modulation pattern is characterized by a repetition length in the range 3 to 30 km,. The pattern waveform is preferably sinusoidal, triangular or trapezoidal.

Figure 3:
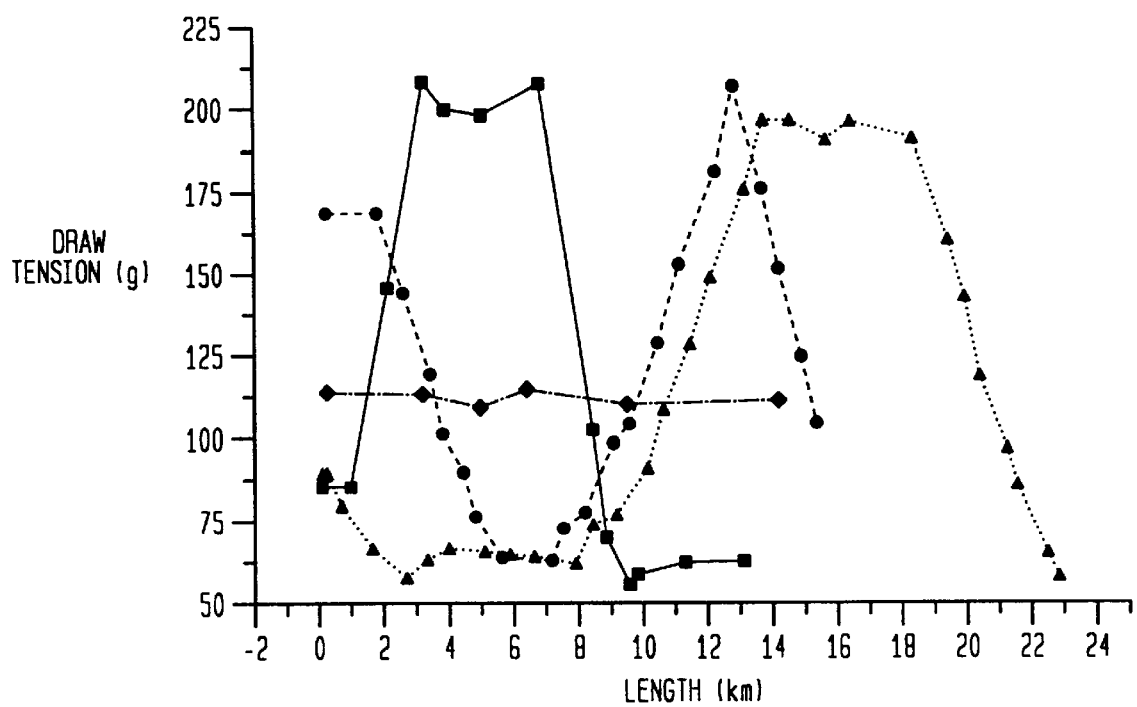
FIG. 3 graphically illustrates draw tension as a function of fiber length for several different tension modulation waveforms.

A set of experimental tension waveforms are illustrated in FIG. 3. A constant tension draw is shown (for reference) as diamond-shaped dots, a triangle waveform is shown as circular dots, and two different trapezoidal draws are rectangular and triangular dots, respectively.

The residual strain induced on the fiber during the draw process reduces SBS. The residual strain modulation changes the velocity of the acoustic wave in the fiber, thereby shifting the frequency of the Stokes light being amplified such that depletion of the input light is reduced. The extent of SBS suppression is typically measured by the increase in threshold input power, $P_{inc}$, defined as the input power necessary for the Stokes light at the input end of the fiber to equal the transmitted pump light. The higher the threshold input power, the greater the SBS suppression. For input pump powers greater than $P_{inc}$, the effects of SBS are considered significant. For useful results, SBS should be suppressed by 2 dB or more as compared with a fiber drawn under constant tension.

Figure 4:
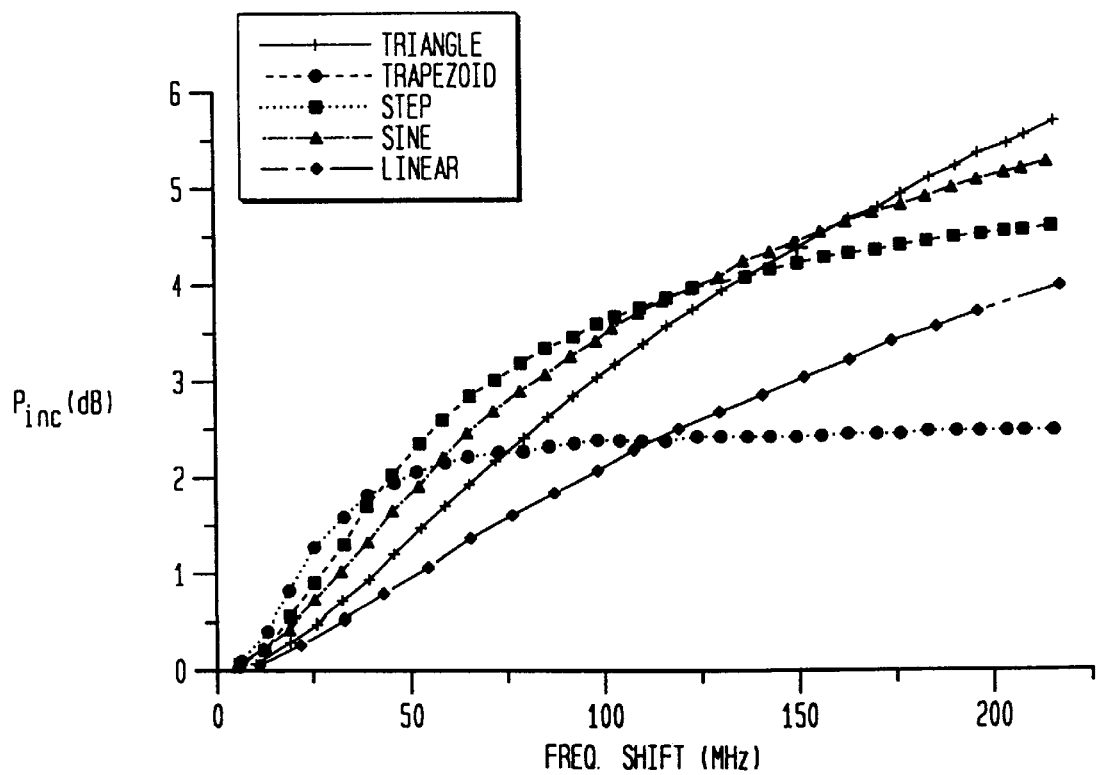
FIG. 4 graphically illustrates calculated SBS threshold $P_{inc}$ as a function of the frequency shift induced by the tension modulation waveforms of FIG. 3.

FIG. 4 graphically illustrates the calculated thresholds for a 25 km length of fiber processed by various tension modulation waveforms. As can be seen, the triangle and trapezoid waveforms produce higher thresholds than the linear and step forms. Indeed the trapezoid tension modulation shows a surprisingly large 2.5 dB SBS suppression as compared with a fiber drawn under constant tension.

It is to be understood that the above-described embodiments are illustrative of only a few of the many possible specific embodiments which can represent applications of the invention. Numerous and varied other arrangements can be devised by those skilled in the art without departing from the spirit and scope of the invention.

What is claimed:

1. A method for making Ge-doped optical fiber having reduced Brillouin scattering loss comprising the steps of:

providing a glass optical fiber preform having a Ge-doped core;

heating a region of said preform to permit drawing a fiber therefrom;

drawing a fiber from said preform with a draw tension modulated with length, said draw tension modulated between a low of 10–50 g and a high of 150–250 g.

2. The method of claim 1 wherein said draw tension is modulated with respect to length with a half-sinusoidal waveform having a length in the range 3 km to 30 km.

3. The method of claim 1 wherein said draw tension is modulated with respect to length with a triangular waveform having a triangular base length in the range 3 km to 30 km.

4. The method of claim 1 wherein said draw tension is modulated with respect to length with a trapezoidal waveform having a major base length in the range 3 km to 15 km and a minor base length in the range 1 km to 15 km.

5. A Ge-doped optical fiber made by the process of claim 1.

* * * * *